(12) United States Patent
Gruttadauria et al.

(10) Patent No.: US 8,300,098 B1
(45) Date of Patent: Oct. 30, 2012

(54) TECHNIQUES FOR PROVIDING ACCESS TO VIDEO DATA USING A NETWORK ATTACHED STORAGE DEVICE

(75) Inventors: Brian Gruttadauria, Sutton, MA (US); Shyam Sareen, Bedford, MA (US); Joseph Frank, Boulder, CO (US); Paul Malenfant, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1079 days.

(21) Appl. No.: 12/211,235

(22) Filed: Sep. 16, 2008

(51) Int. Cl.
*H04N 7/18* (2006.01)

(52) U.S. Cl. ........................ 348/143; 709/223

(58) Field of Classification Search .................. 348/143; 709/223
See application file for complete search history.

(56) References Cited

U.S. PATENT DOCUMENTS

| | | | | |
|---|---|---|---|---|
| 6,525,761 B2* | 2/2003 | Sato et al. .................. | 348/14.04 |
| 7,382,244 B1 | 6/2008 | Donovan et al. | |
| 7,386,872 B2* | 6/2008 | Shimizu .................. | 725/105 |
| 7,460,149 B1 | 12/2008 | Donovan et al. | |
| 7,496,647 B2 | 2/2009 | Karaoguz et al. | |
| 7,500,246 B2 | 3/2009 | Saake et al. | |
| 7,543,327 B1* | 6/2009 | Kaplinsky ...................... | 725/105 |
| 7,555,613 B2 | 6/2009 | Ma | |
| 7,859,571 B1* | 12/2010 | Brown et al. .............. | 348/211.3 |
| 2003/0067387 A1* | 4/2003 | Kwon et al. ................... | 340/540 |
| 2003/0079016 A1* | 4/2003 | Tsao ............................. | 709/226 |
| 2003/0117500 A1* | 6/2003 | Lin .............................. | 348/211.3 |
| 2004/0049797 A1 | 3/2004 | Salmonsen | |
| 2004/0080615 A1* | 4/2004 | Klein et al. .................... | 348/143 |
| 2004/0117836 A1* | 6/2004 | Karaoguz et al. ............... | 725/81 |
| 2005/0078180 A1* | 4/2005 | Nakamura ..................... | 348/143 |
| 2005/0235336 A1 | 10/2005 | Ma | |
| 2006/0020960 A1* | 1/2006 | Relan et al. ...................... | 725/30 |
| 2006/0248038 A1* | 11/2006 | Kaplan et al. ...................... | 707/1 |
| 2006/0271695 A1* | 11/2006 | Lavian ........................... | 709/229 |
| 2006/0279628 A1* | 12/2006 | Fleming ......................... | 348/143 |
| 2006/0284981 A1* | 12/2006 | Erol et al. .................... | 348/207.1 |
| 2007/0022185 A1* | 1/2007 | Hamilton et al. ............... | 709/220 |
| 2007/0098397 A1* | 5/2007 | Chen et al. .................... | 396/429 |
| 2007/0183768 A1* | 8/2007 | Mottur et al. .................. | 396/300 |
| 2007/0199032 A1* | 8/2007 | Renkis .......................... | 725/105 |
| 2008/0303903 A1* | 12/2008 | Bentley et al. ................. | 348/143 |
| 2009/0015672 A1* | 1/2009 | Clapp ............................ | 348/143 |
| 2009/0027495 A1* | 1/2009 | Oskin et al. .................... | 348/143 |
| 2009/0031381 A1* | 1/2009 | Cohen et al. ................... | 725/115 |
| 2009/0085740 A1* | 4/2009 | Klein et al. .................... | 340/540 |
| 2009/0136030 A1* | 5/2009 | Xie et al. ....................... | 380/210 |
| 2010/0007731 A1* | 1/2010 | Joseph et al. .................. | 348/143 |
| 2010/0217837 A1* | 8/2010 | Ansari et al. .................. | 709/218 |

\* cited by examiner

*Primary Examiner* — Asad Nawaz
*Assistant Examiner* — Waseem Asharf
(74) *Attorney, Agent, or Firm* — BainwoodHuang

(57) ABSTRACT

An improved technique provides access to video data using a network attached storage (NAS) device. The technique involves detecting access to a video camera from the NAS device through a network, and receiving a video store command from a user workstation through the network. The video store command directs the NAS device to store video data provided by the video camera to the NAS device through the network. The technique further involves storing the video data provided by the video camera to the NAS device through the network in response to the video store command.

16 Claims, 5 Drawing Sheets

TECHNIQUES FOR PROVIDING ACCESS TO VIDEO DATA USING A NETWORK ATTACHED STORAGE DEVICE

BACKGROUND

A general purpose computer typically allows for direct user interaction. For example, it is common for a general purpose computer to include a keyboard, a mouse and a user display, and to run a variety of user-level applications such as an e-mail application, a web browser, a word processor, and so on. For each user-level application, the heavily-provisioned operating system of the general purpose computer typically generously allocates and coordinates processor time, semiconductor memory, and access to peripheral devices, among other things.

A network attached storage (NAS) unit typically has the sole purpose of providing file-based data storage services to other computerized devices through a network. Such data storage services include file sharing, as well as file backup and restoration. The operating system of the NAS unit is typically optimized so that the NAS unit provides these data storage services to the other computerized devices in a high availability/low-latency manner.

In contrast to a general purpose computer, the NAS unit is not conveniently designed to carry out user-level general purpose computing tasks. Along these lines, the NAS unit typically runs a slimmed-down operating system and file system, and processes only I/O requests via a standard file sharing protocol (e.g., CIFS, NFS, etc.). User-level functionality such as user-level e-mail, web browsing and word processing as well as the associated drivers and support features are purposefully omitted for efficiency. As a result, user-level access to the NAS unit is exclusively through another computerized device such as a general purpose computer which connects to the NAS unit through a network.

SUMMARY

Unfortunately, the above-described conventional NAS unit is not well-equipped for direct video storage and management. For example, the conventional NAS unit typically does not contain appropriate drivers to directly handle video data from a video camera. Accordingly, for the conventional NAS unit to obtain video data from a video camera, other external video processing equipment such as a digital video recorder (DVR) or a general purpose computer typically must first capture and process the video data, and then copy the video data to the NAS unit.

One alternative to initially capturing video data on external video processing equipment such as a general purpose computer before sending it to a NAS unit involves simply storing the video data in a more-permanent manner on the general purpose computer. However, the general purpose computer may not be particularly well-suited for storing the video data from the video camera. Along these lines, the general purpose computer may not possess adequate storage capacity, or backup/recovery functionality to efficiently and safely store and/or share the video data.

In contrast to the above-described conventional general purpose computer and NAS unit, an improved NAS device is well-suited for providing access to video data. Such a NAS device is capable of detecting access to a video camera from the NAS device through a network, e.g., using Universal Plug and Play (UPnP) auto discovery. Such a NAS device is further capable of robustly and reliably receiving and storing video data directly from the video camera through the network. Since the NAS device obtains the video data directly from the video camera, external video processing equipment (e.g., a DVR or general purpose computer) does not need to process any video data from the video camera.

One embodiment is directed to a method of providing access to video data using a NAS device. The method includes detecting access to a video camera from the NAS device through a network, and receiving a video store command from a user workstation through the network. The video store command directs the NAS device to store video data provided by the video camera to the NAS device through the network. The method further includes storing the video data provided by the video camera to the NAS device through the network in response to the video store command.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved network attached storage (NAS) device is well-suited for providing access to video data. Such a NAS device is capable of detecting access to a video camera from the NAS device through a network, e.g., using Universal Plug and Play (UPnP) auto discovery. Such a NAS device is further capable of robustly and reliably receiving and storing video data directly from the video camera through the network. Since the NAS device obtains the video data directly from the video camera, external video processing equipment (e.g., a DVR or general purpose computer) does not need to process any video data from the video camera.

Figure 1:
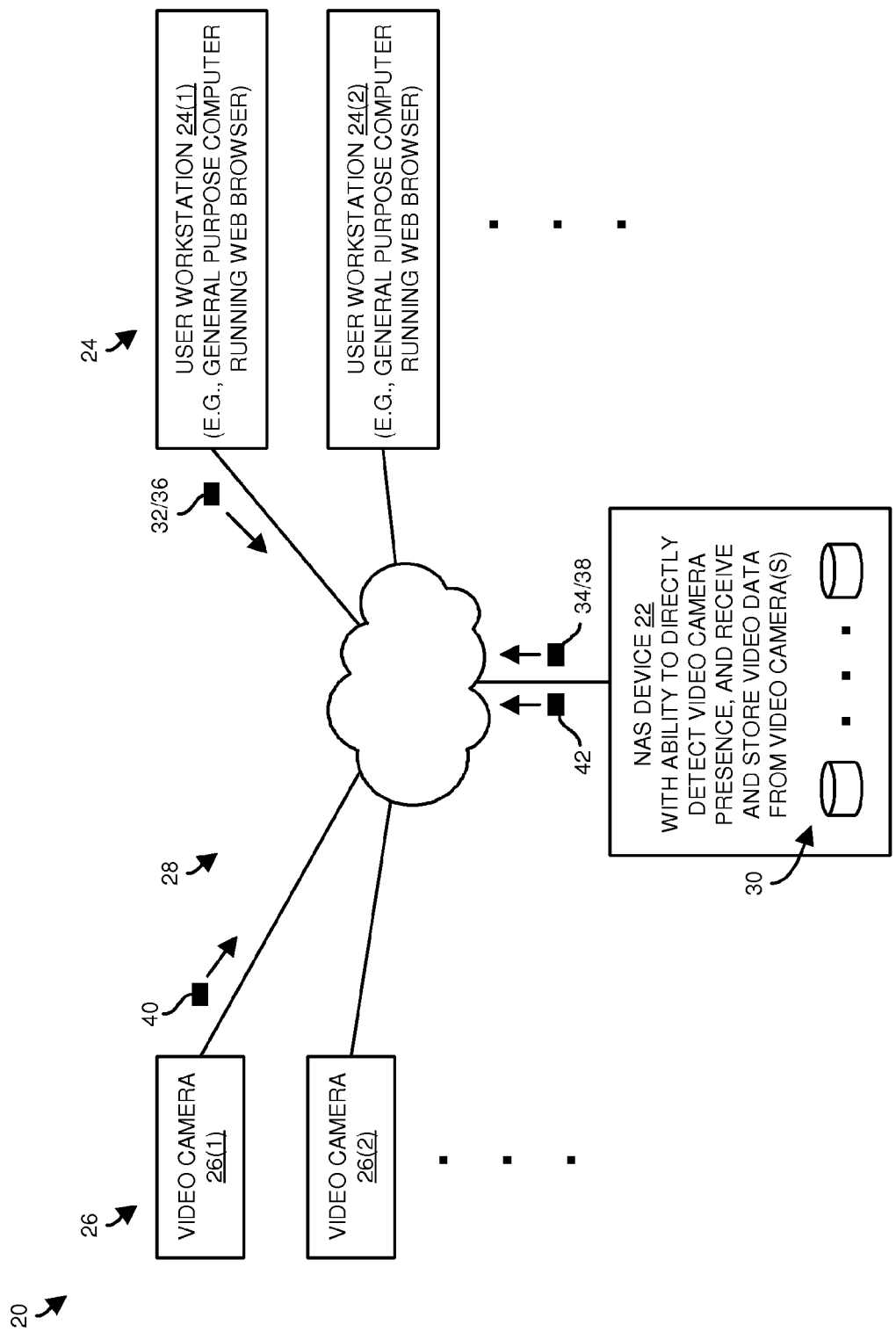
FIG. 1 is a block diagram of a system which utilizes an improved NAS device which is well-suited for providing access to video data.

FIG. 1 shows a system 20 which provides robust and reliable access to video data. The system 20 includes a NAS device 22, a set of user workstations 24(1), 24(2), . . . (collectively, user workstations 24), a set of video cameras 26(1), 26(2), . . . (collectively, video cameras 26), and communications media (or a network) 28. The communications media 28 is shown, by way of example only, as having a hub and spoke configuration (i.e., with each component connecting a network cloud). It should be understood that a variety of other network topologies are suitable for use by the system 20 such as wireless, backbone, ring, combinations thereof, etc.

During operation, the NAS device 22 acts as a dedicated data storage server which carries out file sharing tasks using non-volatile storage 30 (e.g., a single disk drive, an array of disk drives arranged in a RAID group, etc.) on behalf of the user workstations 24. In particular, the NAS device 22 processes file-based data storage requests 32 from the user workstations 24 in accordance with a set of file sharing protocols (e.g., CIFS for Windows, NFS for Unix, etc.) while the user workstations 24 separately carryout general purpose computing tasks (e.g., user-level e-mail, web browsing and word processing).

In addition to providing data storage responses 34 in response to the data storage requests 32, the NAS device 22 is constructed and arranged to perform, as a set of file-based data storage services to the user workstations 24, file backup routines and file restoration operations to backup and recover files on behalf of the user workstations 24. Moreover, such operations can be controlled through a graphical user interface (GUI) provided by a web browser of the NAS device 22 and displayed on a web browser of a user workstation 24. Such GUI is described in U.S. application Ser. No. 11/824,187, filed on Jun. 29, 2007, and entitled "TECHNIQUES FOR OPERATING A DATA STORAGE ASSEMBLY VIA A SERIES OF WEB PAGES AND A COMMIT-AT-THE-END, WIZARD-STYLE BEHAVIOR", the entire teachings of which are hereby incorporated by reference.

With the NAS device 22 operating as a dedicated data storage server, the NAS device 22 is equipped to receive video commands 36 from the user workstations 24, and provide reply messages 38 back to the user workstations 24 in response to the video commands 36. Similarly, the NAS device 22 is equipped to receive camera output signals 40 (e.g., video data, camera information, etc.) from the video cameras 26, and send camera control signals 42 to the video cameras 26 to control the video cameras 26. Along these lines, the NAS device 22 is able to detect the set of video cameras 26 (i.e., one or more video cameras 26) as they individually become available on the network 28, and to store video data directly from the video cameras 26 (see the camera output signals 40 in FIG. 1). Such video storage and management by the NAS device 22 is controllable through the earlier mentioned GUI which is displayed on a user workstation 24. Further details will now be provided with reference to FIG. 2.

Figure 2:
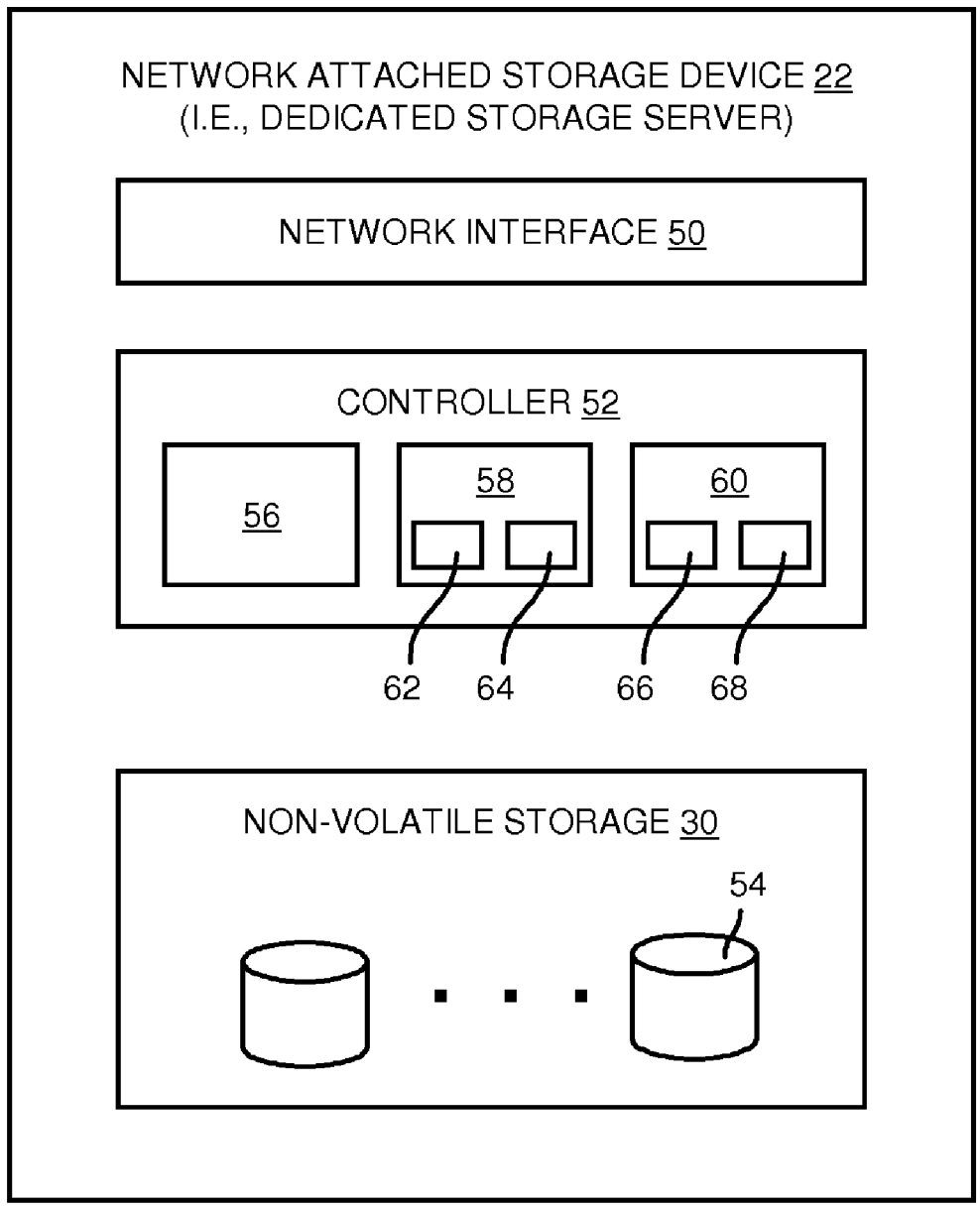
FIG. 2 is a block diagram of the NAS device of FIG. 1.

FIG. 2 is a block diagram of the NAS device 22. The NAS device 22 includes the earlier-mentioned non-volatile storage 30, a network interface 50, and a controller 52. The non-volatile storage 30 includes one or more storage units 54 such as disk drives, flash memory, tape drives, combinations thereof, and the like, for reliable high capacity storage, backup and recovery. The network interface 50 is constructed and arranged to connect to the network 28 (e.g., Ethernet connectivity, wireless access, etc., also see FIG. 1). The controller 52 includes a set of processors 56 (i.e., one or more) running an optimized data storage operating system 58 and software applications 60 for robust and reliable NAS device operation.

The operating system 58, which is optimized to process the data storage requests 32 from the user workstations 24, includes a built-in video camera discovery module 62 and video decoder 64 (i.e., software routines, drivers, MPEG converters, and remaining framework for properly communicating with and processing video data from the video cameras 26). Furthermore, the applications 60 include a web server 66 and other tools 68 (e.g., decryption capabilities if the video data from the video camera 26 is encrypted). As will be described in further detail shortly, the web server 66 is equipped to provide a web-based GUI which offers integrated file-based data storage control and video surveillance control to users of the user workstations 24.

At this point, it should be understood that, as part of its NAS operation, the controller 52 is constructed and arranged to detect access to the video cameras 26 through the network interface 50 and the network 28. If the NAS device 22 is operational on the network 28 but there are no video cameras 26 initially on the network 28, such detection occurs incrementally as each video camera 26 is added to the network 28. On the other hand, if there are video cameras 26 currently on the network 28 but the NAS device 22 initially is not on the network 28, the NAS device 22 is able to search for and find the video cameras 26 which are currently available on the network 28.

Once the controller 52 has detected a video camera 26, the controller 52 is able to accumulate video data from that video camera 26. In particular, the controller 52 is able to receive a video store command from a user workstation 24 through the network interface 50 and the network 28 (see the video command 36 in FIG. 1), and store the video data in the non-volatile storage 30 in response to the video store command.

In some arrangements, the NAS device 22 and the video cameras 26 utilize Universal Plug and Play (UPnP) protocols for automatic discovery and configuration. UPnP v1.4 or higher (e.g., UPnP v1.6) are suitable versions of UPnP. In these arrangements, when a video camera 26 connects to the network 28, the video camera advertises its services to the NAS device 22. The controller 52 of the NAS device 22, under direction of a user of one of the user workstations 24 is then able to configure and control the video camera 26 (e.g., send actions, receive event notifications, view status, etc.). Further details will now be provided with reference to FIG. 3.

Figure 3:
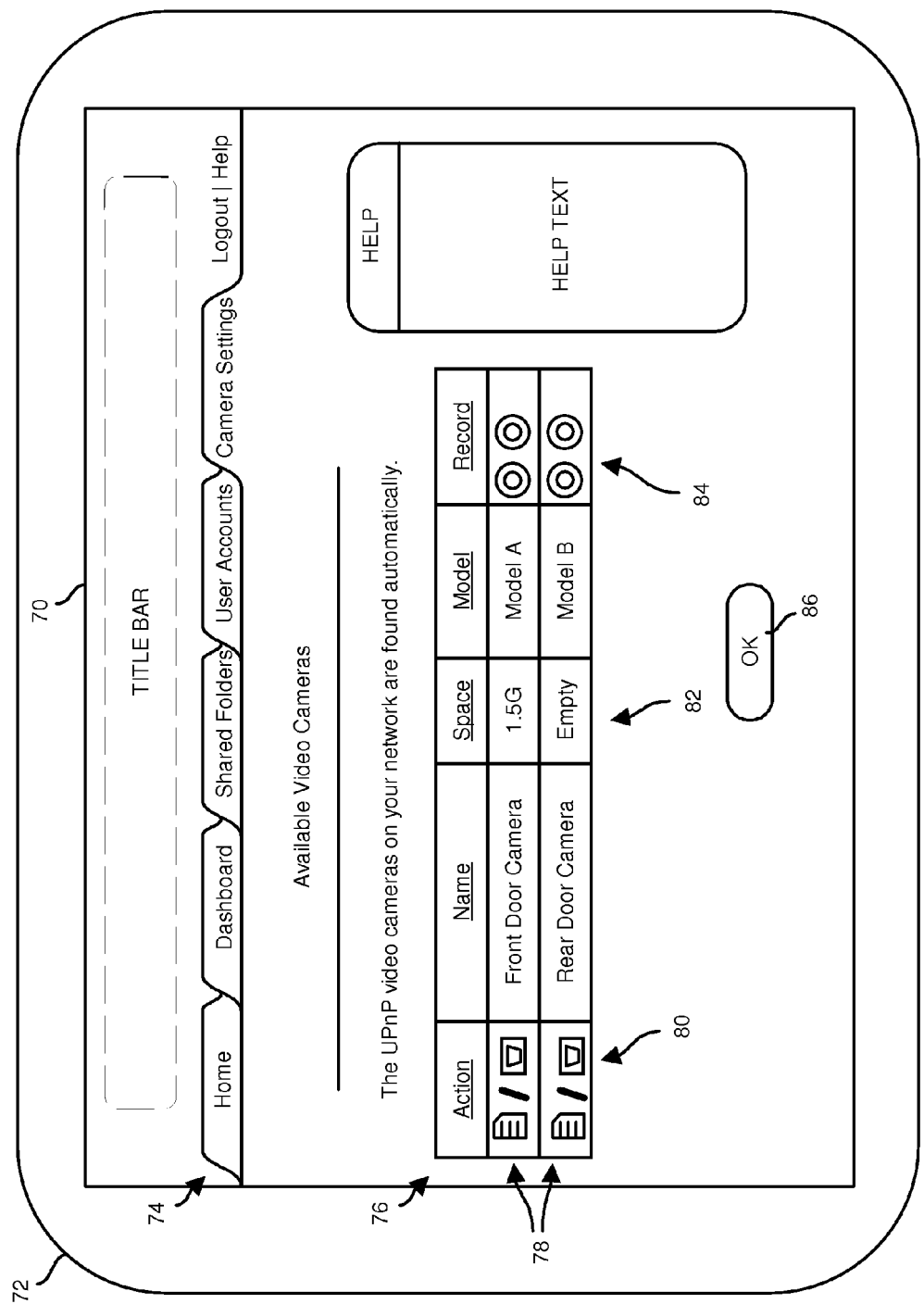
FIG. 3 is a block diagram of a graphical user interface to the NAS device which is viewable from a user workstation display.

FIG. 3 is a general diagram of a GUI 70 to the NAS device 22 which is viewable from a display 72 of a user workstation 24 (FIG. 1). In some arrangements, the GUI 70 takes the form of a web page which is provided by the web server 66 running on the NAS device 22; such an arrangement is well suited for a general purpose computer running a web browser. In other arrangements, the GUI 70 takes the form of an independent window which is rendered on the display 72 of the user workstation 24 by specialized client software (e.g., an installed computer program product) running on the user workstation 24.

As shown in FIG. 3, the GUI 70 includes, among other things (e.g., a title bar, a help pane, etc.), a tabs area 74 which allows a user to select one of multiple tabs, and a main viewing area 76 which operates as a dialog box based on the particular selected tab in the tabs area 74. To illustrate certain features of the NAS device 22, FIG. 3 shows the "camera settings" tab as being selected in the tabs area 74. Accordingly, information regarding the video cameras 26 (FIG. 1) is presented in the main viewing area 76 of the GUI 70.

It should be understood that navigation, selection and data entry via the GUI 70 is possible using a mouse and keyboard of the user workstation 24. Along these lines, various control is available to the user by clicking on particular locations of the GUI 70. For example, the main viewing area 76 includes rows 78 associated with each video camera 26 detected by the NAS device 22. In this example, the NAS device 22 has detected a front door camera and a rear door camera.

Additionally, there are action icons 80 associated with features each detected camera 26 which, if selected by the user, give the user various types of control over that camera 26. Examples of such control features include displaying camera status, changing camera operating parameters, and rendering live video from the camera 26.

Furthermore, there is identifying information and status 82 displayed for each detected camera 26. Such information and status 82 includes camera names, amounts of storage space consumed by video data recorded from the video cameras 26 (e.g., the size of MPEG files), and the model/types of cameras 26 (hi-res, zoom, etc.).

Also, there is a recording control area 84 (e.g., radio buttons for each camera 26) which enables a user to start and stop video recording through each camera 26. Any changes are preferably committed when the user clicks on an "OK" button 86.

With the above-described capabilities provided by the NAS device 22 to a user of the user workstation 24, it should be understood that it is quite simple for the user to direct the NAS device 22 to store video data from a particular video camera 26. In particular, to store video data from a particular video camera 26 (e.g., the Front Door Camera), the user clicks on a particular graphic (e.g., a radio button) in the recording control area 84 for that camera 26, and then clicks on the "OK" button 86. As a result, the user workstation 26 sends a video store command to the NAS device 22 through the network 22 (e.g., see the video command 36 in FIG. 1). Upon receipt of the video store command, the NAS device 22 records video data from that video camera 26 (e.g., see the camera output signals 40 and the camera control signals 42 in FIG. 1). Since the NAS device 22 obtains the video data directly from the video camera 26, the user workstation 26 does not need to process any video data from the video camera 26. Moreover, the recorded video data is robustly and reliably stored on the NAS device 22, e.g., the video data enjoys the file sharing, backup and restoration advantages provided by the NAS device 22.

Furthermore, it is quite simple for the user to view live video by operating the GUI 70. In particular, to view live video from a particular video camera 26 (e.g., the Front Door Camera), the user clicks on a particular icon (e.g., a display icon) in the action icon area 80 for that camera 26, and then clicks on the "OK" button 86. As a result, the user workstation 26 sends a video view command to the NAS device 22 through the network 22 (e.g., see the video command 36 in FIG. 1). Upon receipt of the video view command, the NAS device 22 provide the user workstation 26 with particular configuration details to enable the user workstation 26 to receive live video data directly from the video camera 26 (e.g., see the user workstation reply messages 38, camera output signals 40 and the camera control signals 42 in FIG. 1). Since the user workstation 26 obtains the live video data directly from the video camera 26, the NAS device 22 is not burdened with additional overhead in relaying live video data from the video camera 26 to the user workstation 24. Further details will now be provided with reference to FIG. 4.

Figure 4:
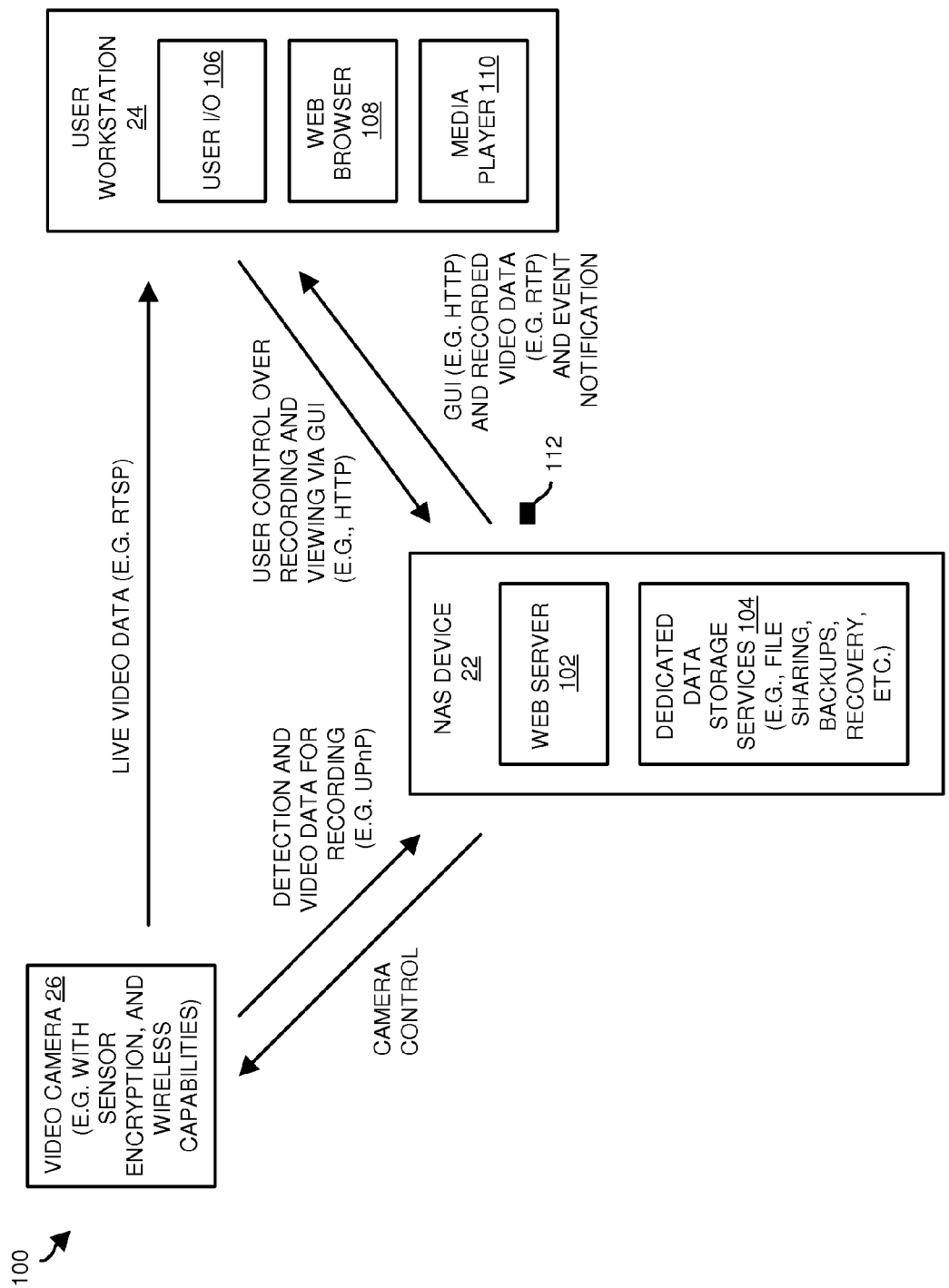
FIG. 4 is a block diagram which illustrates interaction of particular components of the system of FIG. 1.

FIG. 4 is a block diagram which illustrates interaction of particular components of the system 20 which are involved in accessing video data in accordance with a web-based implementation. As shown, the NAS device 22 includes a web server 102 for the GUI 70 (FIG. 3) and dedicated storage services 104 for handling the video data (e.g., MPEG-4 format) and other files). The user workstation 24 includes user I/O 106 (e.g., a keyboard, mouse and display), a web browser 108, and a media player 110.

During operation, the NAS device 22 receives control from the user workstation 24, and provides both the GUI 70 (using HTTP) and access to recorded video data to the user workstation (e.g., using RTP) among other data storage services. The NAS device 22 then directly records video data from the video camera 26 and imposes control over the video camera 26.

For access to live video from the video camera 26, the web browser 108 receives a metafile 112 from the web server 102 of the NAS device 22 in response to a video view command entered into the GUI 70, and passes the metafile 112 to the media player 110. The media player 110 is then able to obtain and render live video directly from the video camera 26 (e.g., using RTSP).

In some arrangements, the system 20 includes sensing capabilities, e.g., detection of activity or motion within a field of view. Such sensing may involve activation of a sensor at the video camera 26, or alternatively processing video data within the NAS device 22 to detect the activity. Upon such detection, the NAS device 22 is able to send a notification signal (e.g., event notification) to the user workstation 24 or similar external device (e.g., an alarm, a telephone, etc.).

In some arrangements, the video camera 26 includes encryption capabilities to encryption the video data, and the NAS device 22 and the user workstation 24 include decryption capabilities to decrypt the video data. Such features enable the system 20 to operate reliably and securely in a wireless setting, and/or over a non-secure network. Further details will now be provided with reference to FIG. 5.

Figure 5:
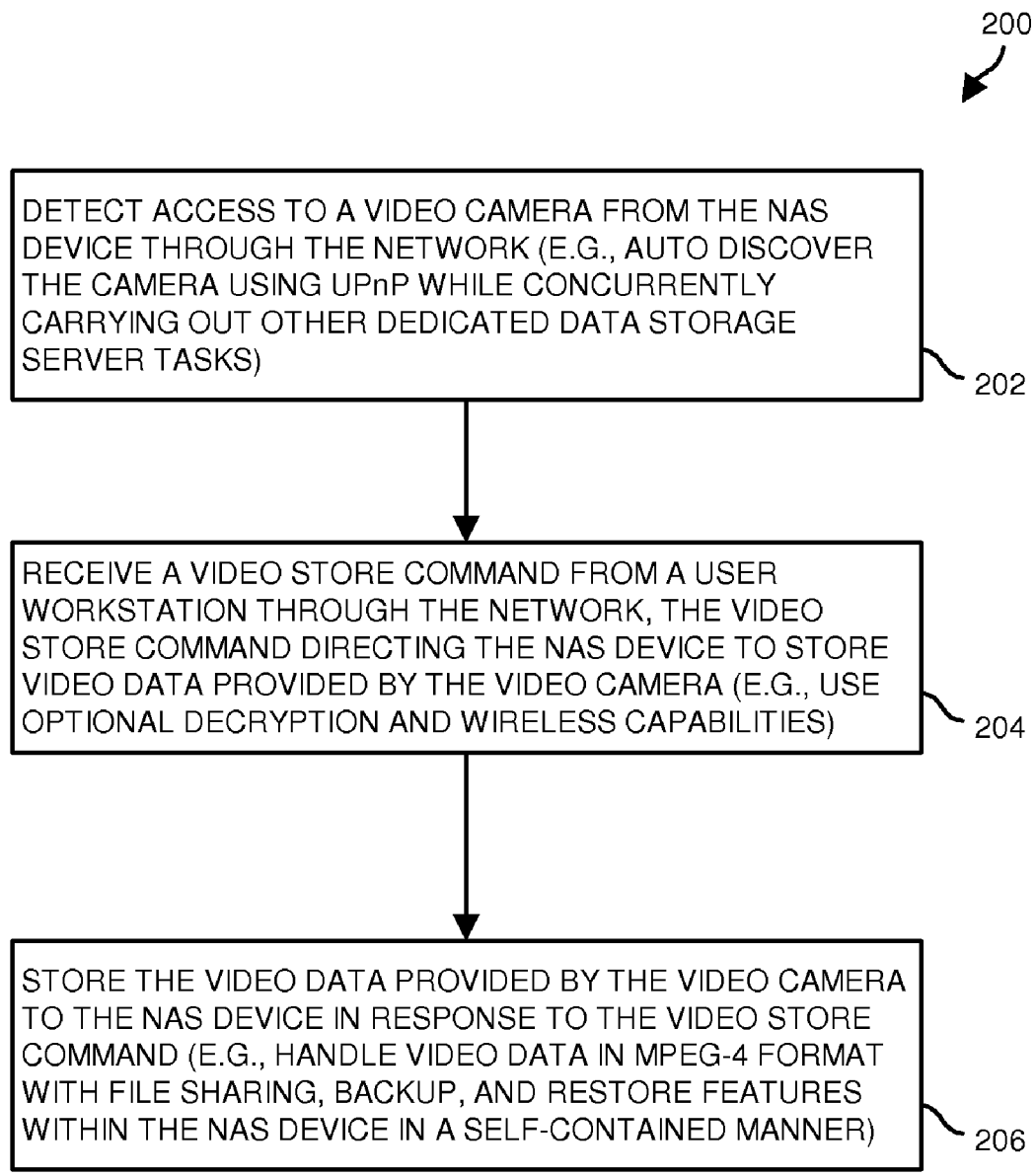
FIG. 5 is a flowchart of a procedure which is performed by the NAS device of FIG. 2.

FIG. 5 is a flowchart of a procedure 200 which is performed by the NAS device 22. In particular, the procedure 200 is performed for each video camera 26 of the system 20. Moreover, the procedure 200 is reliably performed by the NAS device 22 while the NAS device 22 concurrently carries out dedicated data storage server operations on behalf of the user workstations 24, i.e., I/O operations, backup tasks and file restorations which are traditional to a dedicated self-contained data storage server rather than a conventional general purpose computer.

In step 202, the NAS device 22 detects access to a video camera 26 through the network 26. In some arrangements, such detection involves discovery, as well as additional configuration, occur via UPnP.

In step 204, the NAS device 22 receives a video store command from a user workstation 24 through the network 26. The video store command directs the NAS device 22 to store video data provided by the video camera 22 to the NAS device through the network 26.

In step 206, the NAS device 22 stores the video data provided by the video camera 26 in response to the video store command. The NAS device 22 obtains such video data directly from the video camera 26 rather than through another device. The stored video data (e.g., a file in MPEG-4 format) enjoys all of the advantages offered by the available data storage services of the NAS device 22 (e.g., file sharing, backups, file restoration, etc.).

As described above, an improved NAS device 22 is well-suited for providing access to video data. Such a NAS device 22 is capable of detecting access to a video camera 26 from the NAS device 22 through a network 28, e.g., using UPnP auto discovery. Such a NAS device 22 is further capable of robustly and reliably receiving and storing video data directly from the video camera 26 through the network 28. Since the NAS device 22 obtains the video data directly from the video camera 26, external video processing equipment (e.g., a DVR or general purpose computer) does not need to process any video data from the video camera 26.

While various embodiments of the invention have been particularly shown and described, it will be understood by those skilled in the art that various changes in form and details may be made therein without departing from the spirit and scope of the invention as defined by the appended claims.

What is claimed is:

1. In a network attached storage (NAS) device, a method of providing access to video data, the method comprising:
    detecting access to a video camera from the NAS device through a network;

receiving a video store command from a user workstation through the network, the video store command directing the NAS device to store video data provided by the video camera to the NAS device through the network; and storing the video data provided by the video camera to the NAS device through the network in response to the video store command;

wherein the NAS device is a dedicated data storage server which is dedicated to file sharing;

wherein the method further comprises:

processing file-based data storage requests from a set of user workstations in accordance with a set of file sharing protocols while concurrently (i) the dedicated data storage server stores the video data provided by the video camera, and (ii) the set of user workstations carryout general-purpose computing tasks separately from the dedicated data storage server, and performing, as a set of file-based data storage services provided by the dedicated data storage server to the set of user workstations, file backup routines and file restoration operations to backup and recover files on behalf of the set of user workstations;

wherein the dedicated data storage server runs an operating system optimized to process the file-based data storage requests, the operating system including a built-in video camera discovery module; and wherein detecting access to the video camera from the NAS device through the network includes:

automatically detecting connection of the video camera to the network using the built-in video camera discovery module of the operating system running on the dedicated data storage server.

2. A method as in claim 1 wherein the video camera and the dedicated data storage server are constructed and arranged to effectuate automatic discovery in accordance with Universal Plug and Play (UPnP) protocols.

3. A method as in claim 1, further comprising:
providing, through the user workstation, a user interface which is constructed and arranged to provide a user of the user workstation with integrated file-based data storage control and video surveillance control.

4. A method as in claim 3, further comprising:
in addition to receiving the video store command from the user workstation, (i) receiving a video view command from the user workstation, and (ii) configuring the user workstation to render a live video from the video camera in response to the video view command.

5. A method as in claim 4 wherein configuring the user workstation to render the live video from the video camera in response to the video view command includes:
directing the user workstation to access the live video directly from the video camera through the network rather than indirectly through the dedicated data storage server.

6. A method as in claim 1 wherein storing the video data provided by the video camera to the NAS device through the network in response to the video store command includes:
decrypting an encrypted wireless signal from the video camera into the video data; and
saving the video data on disk drive memory within the dedicated data storage server.

7. A method as in claim 1, further comprising:
detecting activity in the vicinity of the video camera in response to the video data provided by the video camera; and
sending notification signal to the user workstation in response to detecting the activity.

8. A network attached storage (NAS) device, comprising:
a network interface constructed and arranged to connect to a network;
a set of storage units; and
a controller coupled to the network interface and the set of storage units, the controller being constructed and arranged to:
detect access to a video camera from the NAS device through the network interface and the network,
receive a video store command from a user workstation through the network interface and the network, the video store command directing the NAS device to store video data provided by the video camera to the NAS device through the network, and
store, on the set of storage units, the video data provided by the video camera to the NAS device through the network interface and the network in response to the video store command;
wherein the NAS device is a dedicated data storage server which is dedicated to file sharing;
wherein the controller is further constructed and arranged to:
process file-based data storage requests from a set of user workstations in accordance with a set of file sharing protocols while concurrently (i) the dedicated data storage server stores the video data provided by the video camera, and (ii) the set of user workstations carryout general-purpose computing tasks separately from the dedicated data storage server, and
perform, as a set of file-based data storage services provided by the dedicated data storage server to the set of user workstations, file backup routines and file restoration operations to backup and recover files on behalf of the set of user workstations;
wherein the controller includes a set of processors which runs an operating system optimized to process the file-based data storage requests, the operating system including a built-in video camera discovery module; and
wherein the controller, when detecting access to the video camera from the NAS device through the network includes automatically detecting connection of the video camera to the network using the built-in video camera discovery module of the operating system.

9. A NAS device as in claim 8 wherein the video camera and the dedicated data storage server are constructed and arranged to effectuate automatic discovery in accordance with Universal Plug and Play (UPnP) protocols.

10. A NAS device as in claim 8 wherein the controller is further constructed and arranged to:
provide, through the user workstation, a user interface which is constructed and arranged to provide a user of the user workstation with integrated file-based data storage control and video surveillance control.

11. A NAS device as in claim 10 wherein the controller is further constructed and arranged to:
in addition to receiving the video store command from the user workstation, (i) receive a video view command from the user workstation, and (ii) configure the user workstation to render a live video from the video camera in response to the video view command.

12. A NAS device as in claim 11 wherein the controller, when configuring the user workstation to render the live video from the video camera in response to the video view command, is constructed and arranged to:
direct the user workstation to access the live video directly from the video camera through the network rather than indirectly through the dedicated data storage server.

13. A NAS device as in claim 8 wherein the controller, when storing the video data provided by the video camera to the NAS device through the network in response to the video store command, is constructed and arranged to:
   decrypt an encrypted wireless signal from the video camera into the video data; and
   save the video data on disk drive memory within the dedicated data storage server.

14. A NAS device as in claim 8 wherein the controller is further constructed and arranged to:
   detect activity in the vicinity of the video camera in response to the video data provided by the video camera; and
   send notification signal to the user workstation in response to detecting the activity.

15. A method as in claim 1, wherein the operating system further includes a video decoder which is constructed and arranged to perform a video decoding operation on video data; and wherein storing the video data provided by the video camera includes:
   receiving the video data from the video camera; and
   performing the video decoding operation on the video data to generate a video file.

16. A method as in claim 15, wherein the dedicated data storage server further runs applications including a web server;
   wherein providing the user interface through the user workstation includes:
   displaying, on the user computer, a web page provided by the web server, the web page including a title bar, a help pane, a tabs area, and a main viewing area.

* * * * *